No. 775,877. PATENTED NOV. 22, 1904.
A. WEDRICK.
WIND MOTOR.
APPLICATION FILED JUNE 20, 1904.
NO MODEL. 5 SHEETS—SHEET 2.
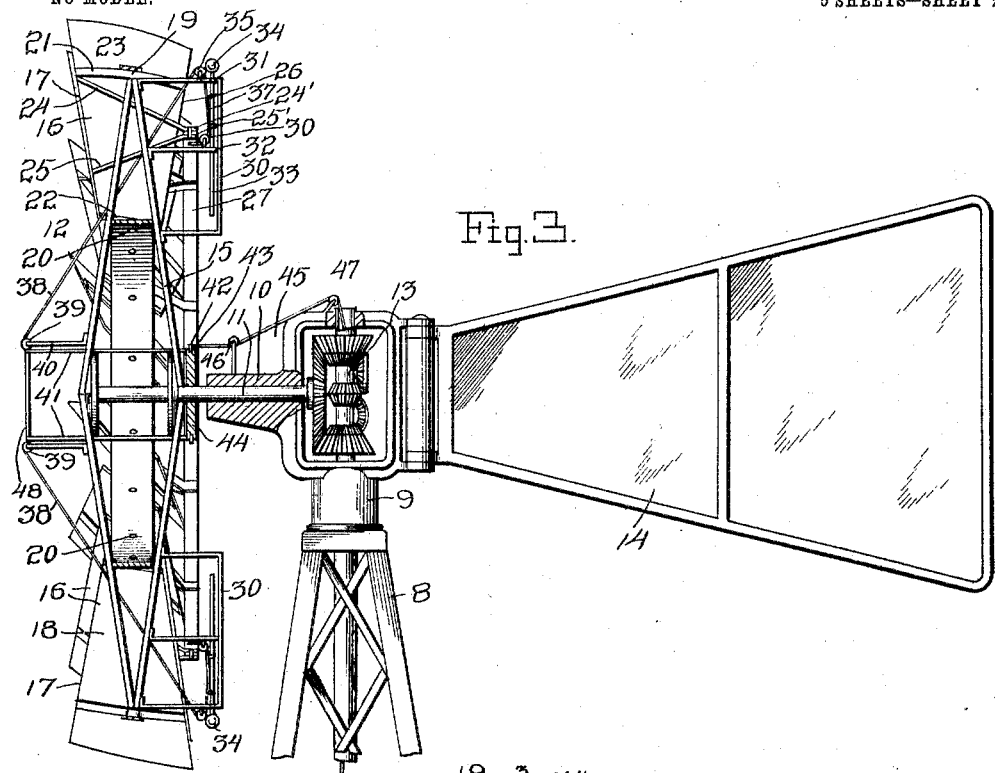
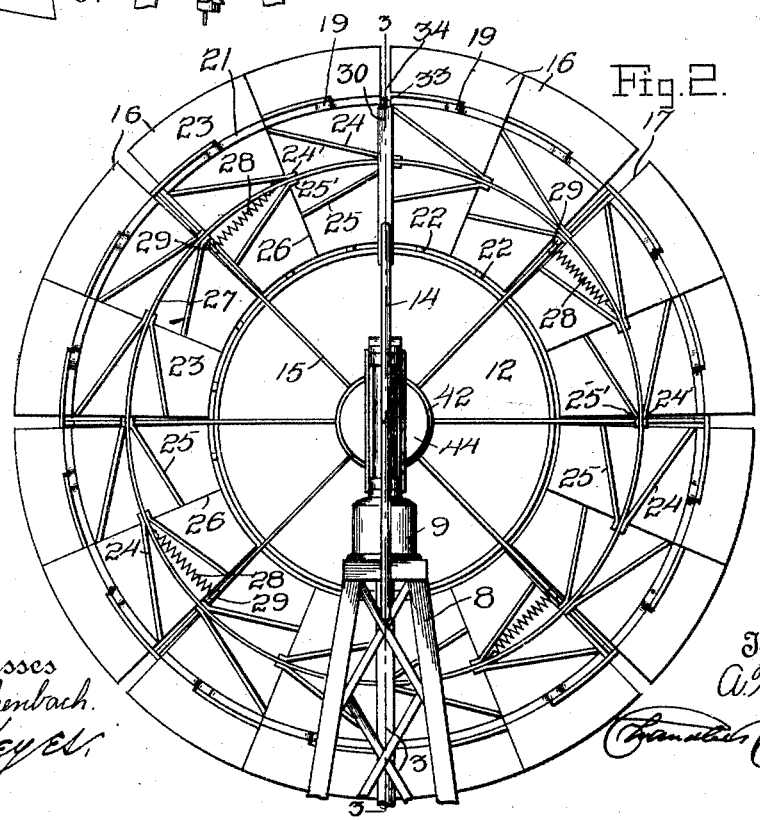
Witnesses
Inventor
A. Wedrick
Attorneys

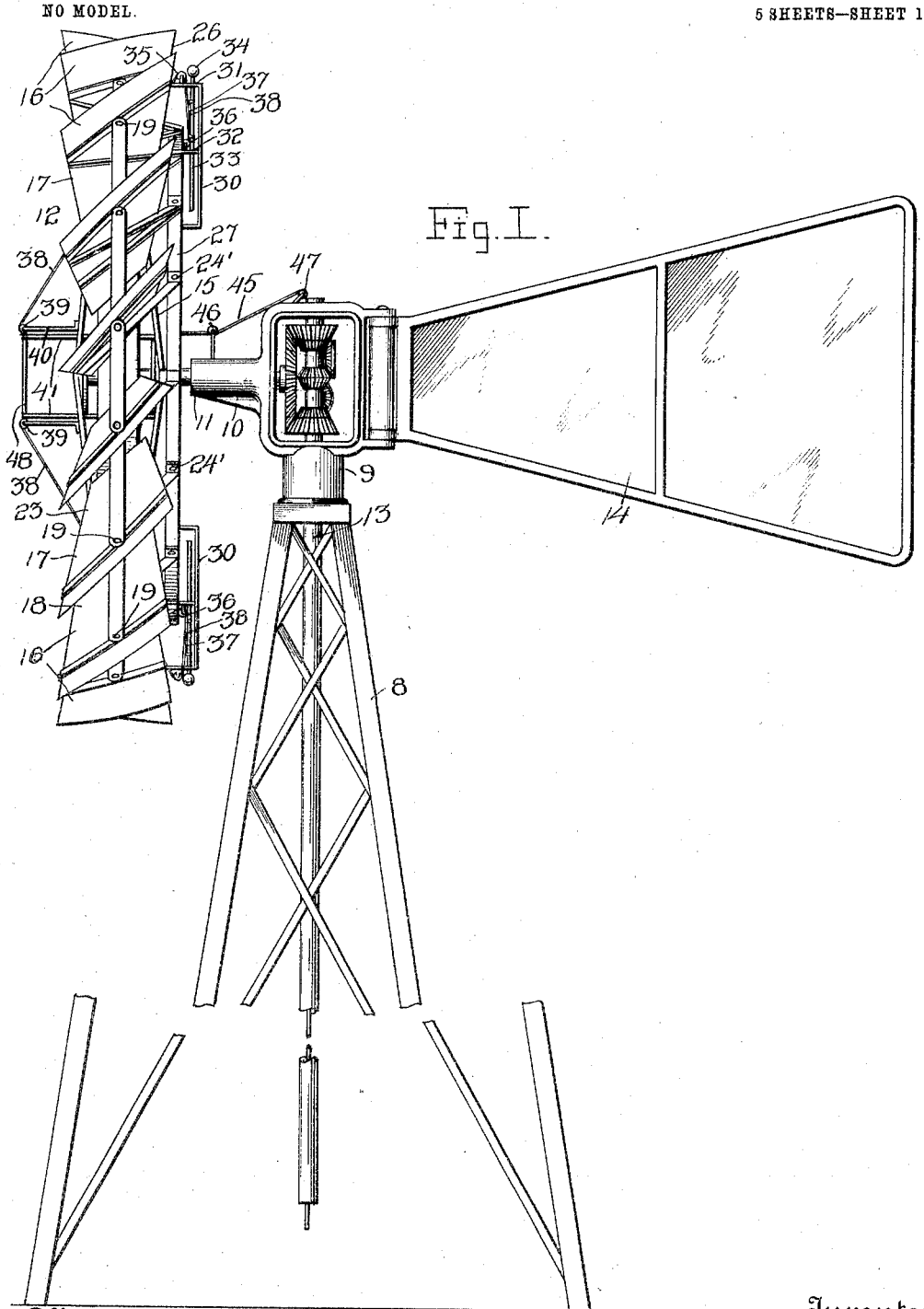

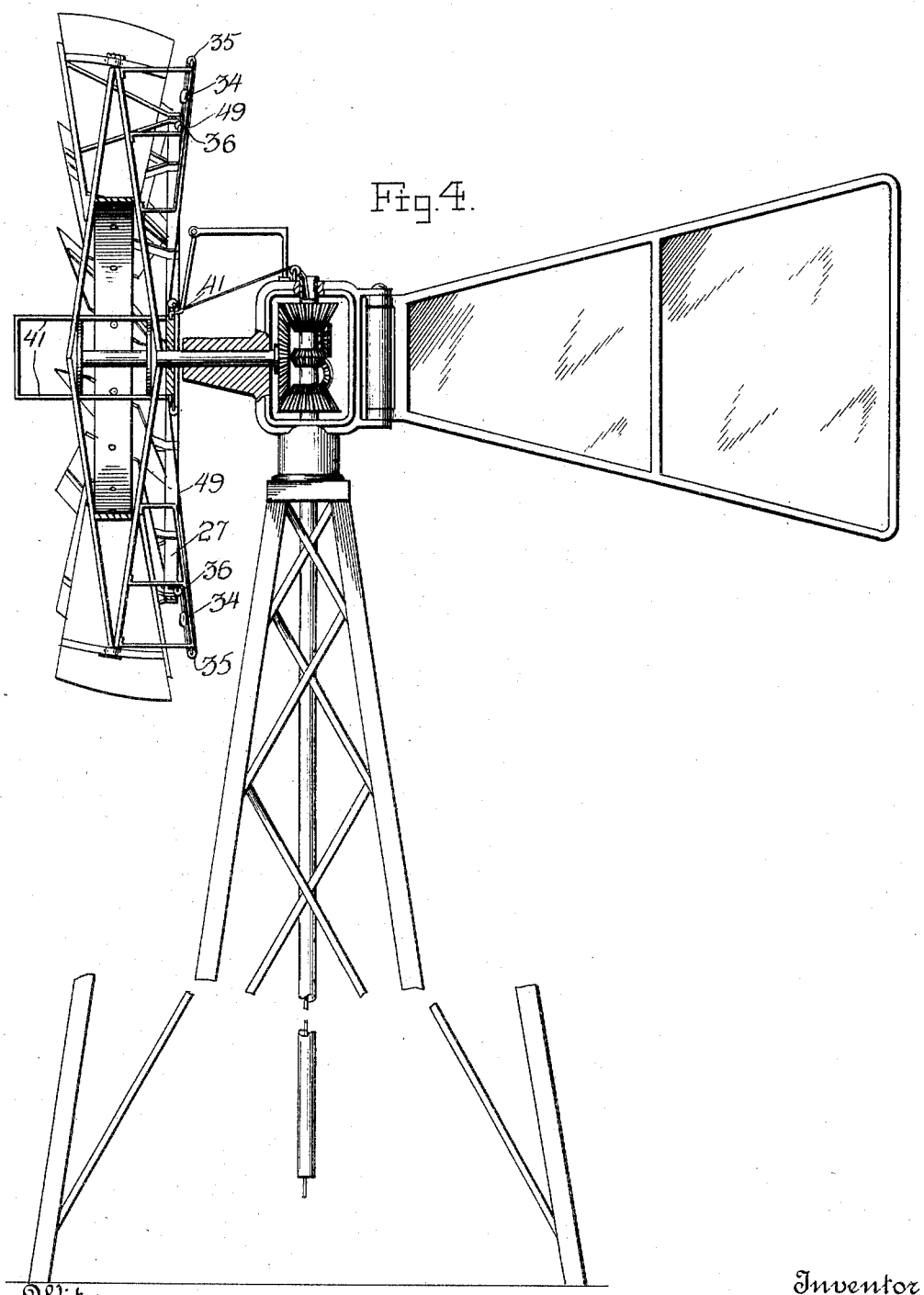

No. 775,877. PATENTED NOV. 22, 1904.
A. WEDRICK.
WIND MOTOR.
APPLICATION FILED JUNE 20, 1904.
NO MODEL. 5 SHEETS—SHEET 4.
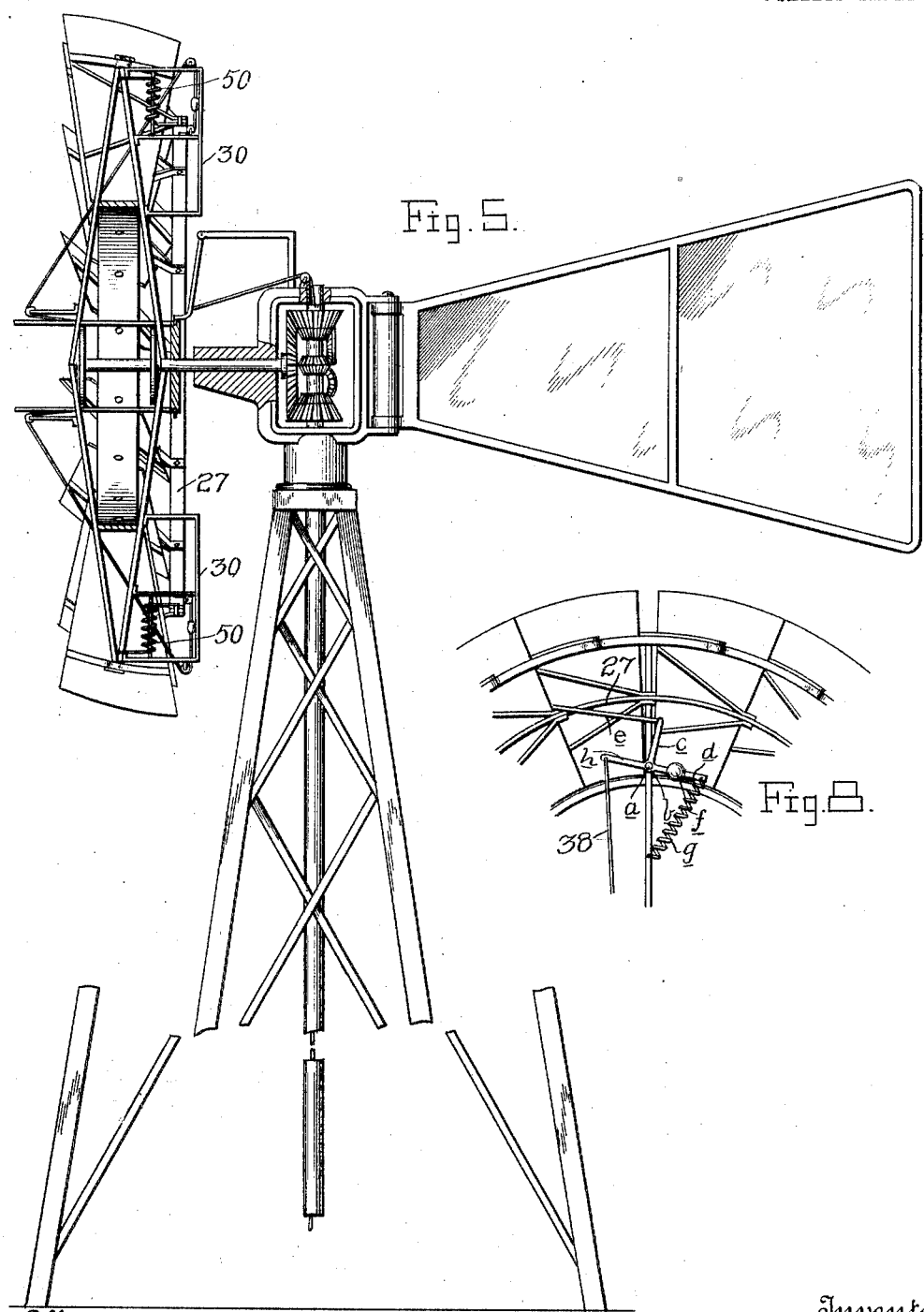

No. 775,877. PATENTED NOV. 22, 1904.
A. WEDRICK.
WIND MOTOR.
APPLICATION FILED JUNE 20, 1904.
NO MODEL. 5 SHEETS—SHEET 5.

Witnesses
C. F. Reichenbach.
W. C. O. Keyes.

Inventor
A. Wedrick
by
Chandler & Chandler
Attorneys.

No. 775,877.

Patented November 22, 1904.

UNITED STATES PATENT OFFICE.

ALEXANDER WEDRICK, OF PULASKI, IOWA.

WIND-MOTOR.

SPECIFICATION forming part of Letters Patent No. 775,877, dated November 22, 1904.

Application filed June 20, 1904. Serial No. 213,389. (No model.)

*To all whom it may concern:*

Be it known that I, ALEXANDER WEDRICK, a citizen of the United States, residing at Pulaski, in the county of Davis, State of Iowa, have invented certain new and useful Improvements in Wind-Motors; and I do hereby declare the following to be a full, clear, and exact description of the invention, such as will enable others skilled in the art to which it appertains to make and use the same.

This invention relates to wind-motors, and more particularly to those of the vertical-wheel type, and has for its object to provide a motor which will be maintained always at or below a certain predetermined rate of speed and which may be moved into and out of operative position when desired.

A further object is to provide an arrangement in which the motor when in inoperative position will lie with its weight disposed centrally of the supporting-tower.

Other objects and advantages will be apparent from the following description, and it will be understood that modifications of the specific construction shown may be made and any suitable materials may be used for the various parts without departing from the spirit of the invention.

Figure 6:
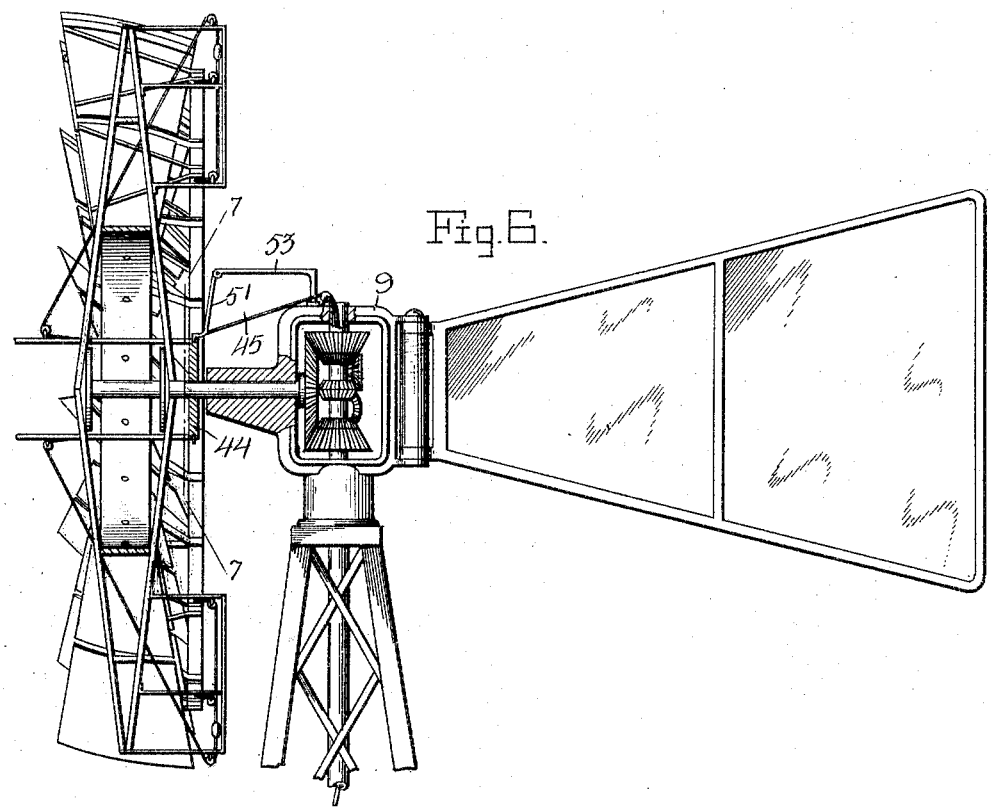
Figure 7:
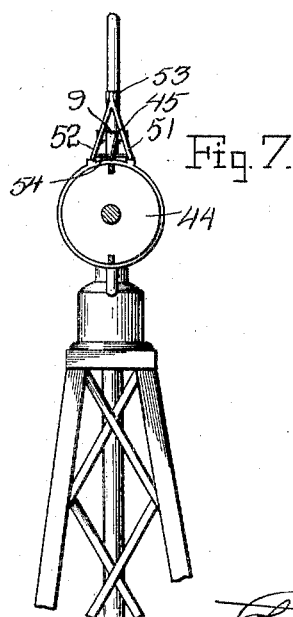

In the drawings forming a portion of this specification, and in which like characters of reference indicate similar parts in the several views, Figure 1 is a side elevation of the motor and a portion of the supporting-tower. Fig. 2 is a rear view of Fig. 1. Fig. 3 is a longitudinal section on line 3 3 of Fig. 2. Fig. 4 is a view of a portion of the motor, showing a modification. Fig. 5 is a view of another modification. Fig. 6 is a view of a further modification, showing the wheel provided with two rows of blades. Fig. 7 is a section on line 7 7 of Fig. 6. Fig. 8 is a view of a further modification.

Referring now to the drawings, there is shown the usual supporting-tower 8, having the framework 9 revolubly mounted thereupon and which carries the working parts of the motor.

Extending forwardly from the framework is the usual hollow arm 10, in which there is journaled the wheel-shaft 11, which has mounted upon its forward end the wheel 12 and which is geared at its rearward end to the hollow vertical shaft 13, which extends downwardly through the tower. Extending rearwardly from the framework 9 is the usual rudder-vane 14, which in the present invention is rigidly secured to the framework to hold the wheel at all times directed toward the wind.

The wheel 12 consists of the usual frame 15, which carries the blades 16, and in the present invention these blades are pivoted in the frame and are movable upon their pivots to direct their edges 17 toward the wind or to bring their faces 18 into position to receive the force of the wind.

The pintles 19 and 20, upon which the blades move pivotally, are carried by braces 21 and 22, which are secured against the rearward faces 23 of the blades transversely thereof, and secured to the rearward faces of the blades between the braces 21 and 22 are diagonal braces 24 and 25, which extend beyond the rearward edges 26 of the blades and are turned to lie parallel to each other, as shown at 24' and 25'. Pivoted between the parallel portions 24' and 25' of the several pairs of braces 24 and 25 is a circular metallic band 27, which lies concentric with the wheel, and it will be understood that rotation of this band independently of the wheel will cause the blades 16 to move upon their pivots. To hold these blades normally with their faces 18 in position to receive the force of the wind, helical springs 28 are secured at one end to the band 27 and at their remaining ends to extensions 29 of the frame 15. Secured to the frame 15 of the wheel at diametrically opposite points thereof are brackets 30, which extend radially of the wheel and which have guides 31 and 32 thereon, in which are slidably engaged rods 33, having weights 34 secured to their outer ends, and it will be understood that as the wheel revolves centrifugal force will cause the rods to move outwardly radially of the wheel in the guides. Mounted upon the brackets adjacent to the guides 31 and 32 are pulleys 35 and 36, respectively, and secured to the rods 33 between the guides 31 and 32 and engaged with the pulleys 36 are cables 37, which extend in the direction of the extensions 29 of the frame and are secured at their free ends to the band 27.

When the motor is in operation, centrifugal force, as mentioned above, causes the rods 33 to move outwardly, which tightens the cables 37 and moves the band 27 against the action of the springs 28 to turn the blades 16 out of the wind, and thus reduce the speed of the wheel, it being understood that the weights are adjustable upon the rods, as shown, to cause the blades to move entirely out of the wind when the wheel has attained a certain speed. Secured to the rods 33 between the guides and engaged with the pulleys 35 are cables 38, these cables being also engaged with pulleys 39, disposed at the outer ends of rods 40, which extend forwardly from the wheel adjacent to the hub thereof, and extending parallel to the rods 40 and slidably mounted upon the wheel are rods 41, which extend through the wheel from front to rear and which have secured to their rearward ends a collar 42, having an exterior peripheral groove 43, in which is loosely disposed a ring 44, having a cable 45 attached thereto, which is engaged with pulleys 46 and 47, mounted upon the framework 9, and is passed downwardly through the hollow shaft 13 to the bottom of the tower, where it may be grasped with the hand. The forward ends of the rods 41 are connected by means of a brace 48, and secured to these rods are the free ends of the cables 38, so that when the cable 45 is pulled the rods 41 will be moved rearwardly through the wheel, and through the medium of the cables 38, the rods 33, and the cables 37 the blades will be moved out of the wind to stop the wheel.

In Fig. 4 there is shown a modification in which the rods 33 are omitted, and a single cable 49, which is engaged with the pulleys 35 and 36, is secured at one end to the band 27 and at the remaining end to one of the rods 41, it being understood that one of these cables 49 is substituted for each of the rods 33. The weights 34 are secured to the cables between the pulleys 35 and 36 and are adjustable thereon, as shown.

In Fig. 5 there is shown a modification in which the springs 28 are omitted and springs 50 are substituted therefor, these springs being mounted in the brackets 30 and having one end secured to the frame of the wheel and the remaining end secured to the band 27.

In Fig. 6 the present invention is shown applied to a wheel having a double row of blades, and in this view the ring 34 has secured thereto the lower ends of upwardly and rearwardly extending rods 51 and 52, which meet at their upper ends and are hinged to a support 53, secured to the framework 9. The rods 51 and 52 are connected by a cross-brace 54, to which is secured the cable 45.

In Fig. 8 of the drawings there is shown a modification in which a stub-shaft $a$ is secured to one of the spokes of the wheel and has revolubly mounted thereon a sleeve $b$, from which there extends at right angles thereto a pair of levers $c$ and $d$, the former being connected, by means of a link $e$, to the band 27, while the lever $d$ is provided with a slidably-mounted weight $f$. Secured at one end to the lever $d$ and at its remaining end to a spoke of the wheel is a helical spring $g$, which is arranged to hold the weighted end of the lever at the limit of its movement in the direction of the hub of the wheel, and it will be apparent that when the wheels revolve the weighted end of the lever will be moved outwardly by centrifugal force and the blades will be moved out of the wind, as will be readily understood. Extending from the sleeve $b$ is a rod $h$, to which the cable 38 is attached, and through the medium of this cable the sleeve may be revolved upon the stub-shaft to move the blades out of the wind. It will be understood, of course, that the above-described mechanism is placed at one side of the wheel and that a similar mechanism is placed at the opposite side, as in the previously-described forms.

What is claimed is—

1. A wind-motor comprising a wheel, blades for the wheel pivotally mounted therein for movement into and out of position to receive the force of the wind, a band pivotally connected with the blades, means for holding the blades yieldably in position to receive the force of the wind, centrifugally-operated mechanism mounted upon the wheel and connected with the band for movement thereof and therewith the blades against the action of the holding means, rods secured to the wheel and projecting forwardly therefrom, pulleys carried by the rods, rods slidably mounted transversely of the wheel, connections between the second-named rods and the blades for movement of the latter against the action of the holding means when the rods are moved rearwardly, and a cable connected with the rods for movement of the latter.

2. A wind-motor comprising a wheel, blades for the wheel pivotally mounted therein for movement into and out of position to receive the force of the wind, braces secured to the blades and extending beyond the rearward edges thereof, a band pivoted between the braces of the several blades, means for holding the blades yieldably in position to receive the force of the wind, centrifugally-operated mechanism mounted upon the wheel and connected with the band for movement of the blades against the action of the holding means, and means for manually moving the blades against the action of the holding means.

3. A wind-motor comprising a wheel, blades for the wheel pivotally mounted therein for movement into and out of position to receive the force of the wind, braces secured to the blades and extending beyond the rearward edges thereof, a band pivoted between the braces of the several blades, means for holding the blades yieldably in position to receive the force of the wind, and centrifugally-operated mechanism secured to the wheel and connected with the band for movement of the blades against the action of the holding means.

In testimony whereof I affix my signature in presence of two witnesses.

ALEXANDER WEDRICK.

Witnesses:
    ELMA ANDREW,
    I. GORDINIER.